July 27, 1926.  
E. E. H. DUCHATEL  
1,593,708
FLUID PRESSURE BRAKING APPARATUS
Filed March 20, 1925   2 Sheets-Sheet 1
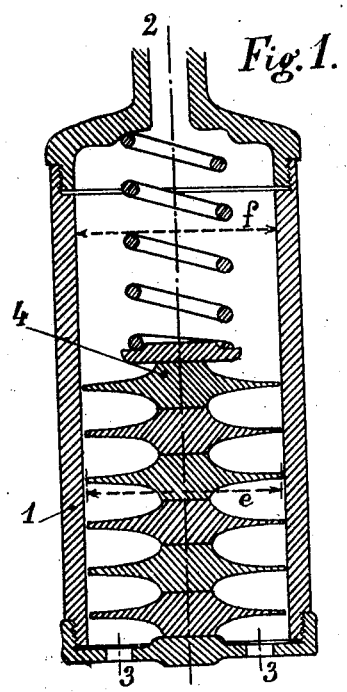
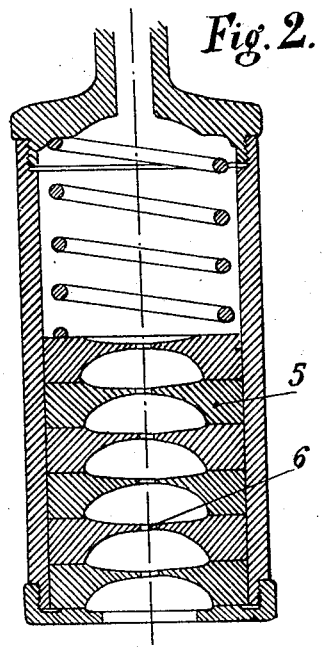
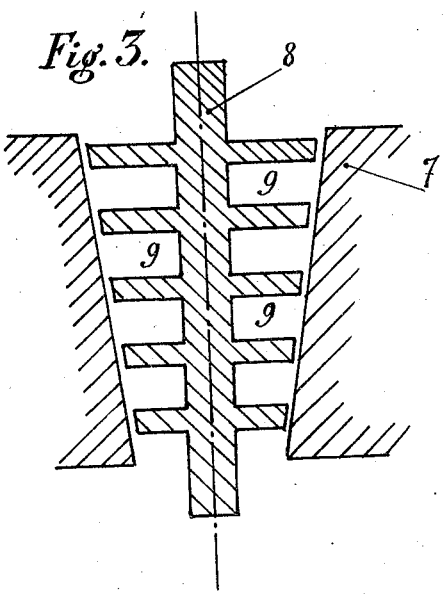
INVENTOR  
EMILE EUGÈNE HENRI DUCHATEL  
BY Wm. M. Cady  
ATTORNEY

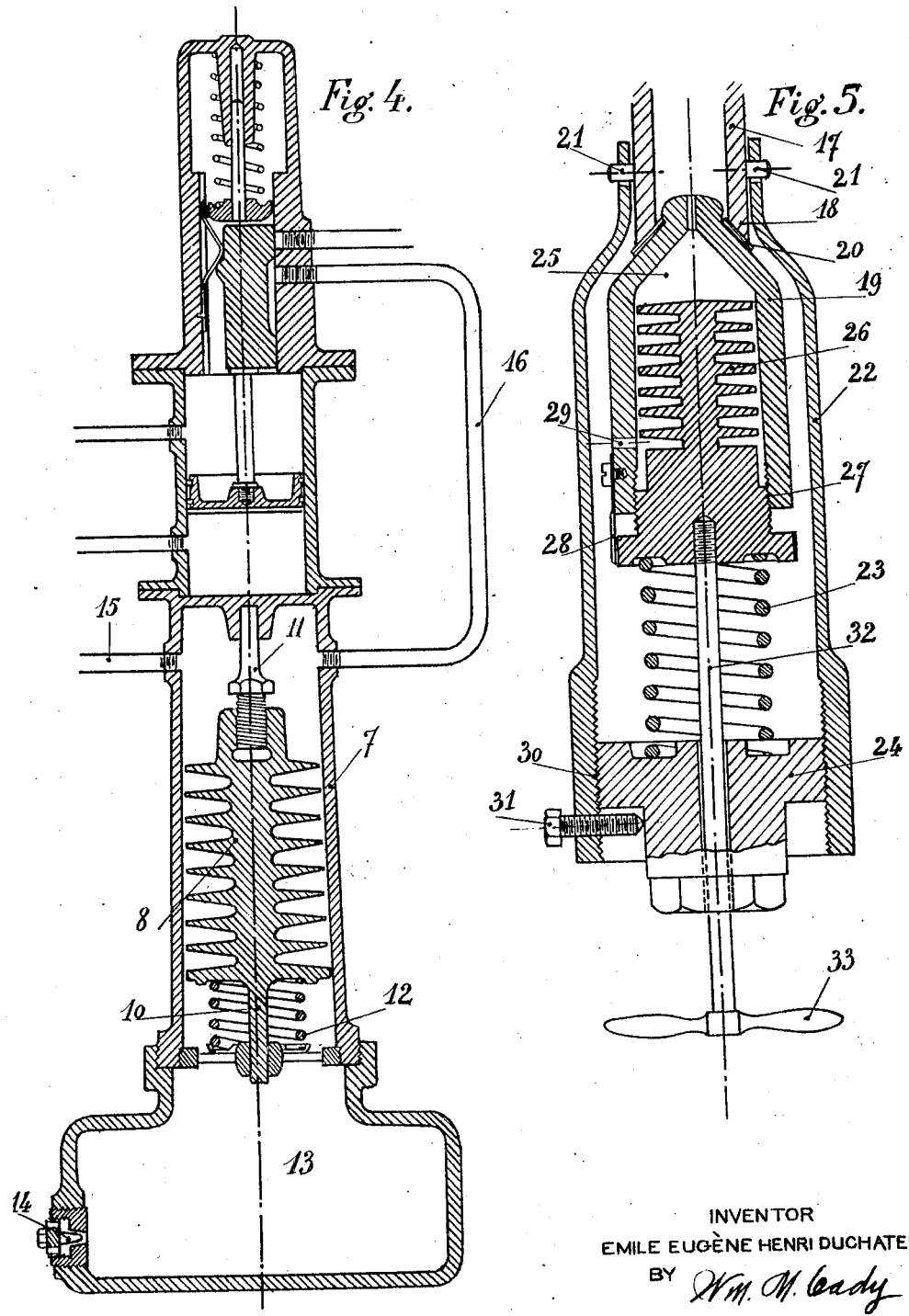

Patented July 27, 1926.

1,593,708

UNITED STATES PATENT OFFICE.

EMILE EUGÈNE HENRI DUCHATEL, OF PARIS, FRANCE, ASSIGNOR TO WESTINGHOUSE AIR BRAKE CO., OF WILMERDING, PENNSYLVANIA.

FLUID-PRESSURE BRAKING APPARATUS.

Application filed March 20, 1925, Serial No. 16,934, and in France March 26, 1924.

This invention relates to fluid pressure brakes, and more particularly to means for controlling the release of the brakes.

In order to safely operate trains in descending long and heavy grades, it is customary to employ a retaining valve device, which is connected to the triple valve exhaust port and when cut in, operates during the release of the brakes to retain a predetermined pressure in the brake cylinder so as to hold the train while the auxiliary reservoirs are being recharged.

The use of a retaining valve device, however, has certain drawbacks. In the first place, the predetermined pressure for which the retaining valve may be adjusted, being fixed, does not provide for variations in the grade and the passing of level spots of greater or less length, and in the second place, the rapid release of the brakes to the point at which the retaining valve acts, causes a rapid reduction in the braking power and a consequent undesired variation in the speed of the train.

With brake equipment having an adjustable release, the above difficulties may be overcome, but a still greater difficulty will result, since it will now be impossible to restore the pressure in the auxiliary reservoirs to the normal standard pressure, without fully releasing the brakes, with the consequent risk of the train assuming an excessive speed.

The principal object of my invention is to provide a brake equipment having means whereby the brakes may be released without encountering any of the above mentioned difficulties.

In the accompanying drawings; Fig. 1 is a sectional view of a release controlling device embodying my invention; Fig. 2 a sectional view of a modified form of release controlling device; Fig. 3 a sectional view of a preferred form of the release controlling device; Fig. 4 a sectional view of the release controlling device shown in Fig. 3 associated with a quick release valve device and having pipe connections adapted to be connected to the usual triple valve device; and Fig. 5 a sectional view of a further modified form of release controlling device.

According to the form of my invention, as shown in Fig. 1, the release controlling device may comprise a cylindrical casing 1, having a passage at one end 2 adapted to be connected to the usual exhaust port of a triple valve device and having atmospheric exhaust ports 3 at the other end of the casing.

Disposed in the casing 1 are a plurality of superimposed disks 4 having a thick central portion and tapering to a thin edge at the periphery. The diameter $e$ of each disk is slightly less than the diameter $f$ of the bore of the casing 1, and the disks thus provide pockets so as to effect a retardation in the rate of flow of air through the successive expansion effects, caused by the flow of air through the pockets.

The rate of flow of air may be varied, either by increasing or diminishing the number of superimposed disks, or by increasing or diminishing the extent of the clearance space between the bore of the casing and the edges of the disks.

In operation, when the triple valve device is moved to release position in order to effect the release of the brakes, the flow of air from the brake cylinder from the triple valve exhaust through the release controlling device will be retarded, and if the device is properly adjusted, the necessary time will be afforded during the release, to permit the recharge of the auxiliary reservoirs, before being obliged to effect a further application of the brakes.

The release controlling device may be removable and may be applied only when needed, the device being secured to the triple valve device by a suitable coupling, so as to connect with the exhaust port of the triple valve device. The device may, if desired, be permanently secured to the triple valve device, and in such case, a cut-out cock may be provided, so that by manipulation of the cock, the exhaust may be connected either to the release controlling device or directly to the atmosphere.

According to the form of release controlling device shown in Fig. 2, superimposed disks 5 are mounted in the casing, the disks in this case being made thin at the central portion and having a central orifice 6. The disks are arranged in contact upon plane or spherical surfaces, which form a tight joint in such a manner that the air can only flow through the central orifices 6. The rate of flow can be regulated by varying the number of disks or the size of the orifices 6.

In the preferred construction, as shown in Fig. 3, the casing 7 is provided with a conical bore, and mounted in said bore is a conical piston 8 formed with annular grooves 9. The piston 8 is supported in any desired manner within the casing 7, so that the axis of the piston coincides with the axis of the casing bore.

The piston 8 may be provided with means for axially adjusting the same relatively to the casing, so that the clearance space between the casing bore and the periphery of the piston arm can be varied from substantially no clearance to any desired amount.

In Fig. 4, a release controlling device of the form shown in Fig. 3 is shown associated with a quick release valve device. The piston 8 of the release controlling device is maintained in position of the bore of the casing 7 by means of a stem 10 at one end, which works in a bore of a member associated with the casing. At the other end, the piston is guided by a stem 11 which has screw-threaded engagement with the piston, so as to permit axial adjustment of the piston 8. A spring 12 is interposed between the piston 8 and the member which serves as a guide for the stem 10 and has an initial tension, tending to urge the piston to a position in which the stem 11 prevents further movement of the piston, unless the piston should fit so closely within the casing that the piston will engage the walls of the casing before the stem contacts with its stop member.

At the lower end, the casing 7 is provided with a chamber 13 having an atmospheric exhaust port 14 which may be constant in area or may be made so that the outlet area can be adjusted. Pipe 15 is connected to the exhaust port of the triple valve device.

With the construction shown in Fig. 4, when the brakes are slowly released, air from the brake cylinder enters the casing 7, through pipe 15, but cannot escape by way of pipe 16, since the quick release slide valve now occupies the position shown in the drawing. The pressure of air released from the brake cylinder will act on the upper face of the piston 8, and should the pressure be insufficient to compress the spring 12, the piston 8 will remain stationary in the casing, and air from the brake cylinder will escape by way of the clearance space between the piston 8 and the walls of the casing 7, the flow depending upon the amount of clearance provided in the limit position of the piston. Air flowing past the piston 8 enters chamber 13 and escapes to the atmosphere by way of port 14.

If the pressure of air from the brake cylinder is high enough to overcome the resistance of spring 12, the piston 8 will be moved downwardly, so that the clearance space between the piston and the walls of the casing is increased and a more rapid flow of air is thus permitted.

According to the size of the exhaust port 14, the pressure of air in chamber 13 will build up, until the pressure in said chamber, together with that of spring 12, is sufficient to move the piston, against the pressure at the upper end, to its upper limit position.

If, at this time, the escape of air at the port 14 is equal to the rate of flow past the piston 8, the piston will remain in its upper position, and air will be released from the brake cylinder at a continuous, uniform rate.

If the area of port 14 is such that flow therethrough exceeds the rate of flow past the piston 8, the back pressure in chamber 13 will decrease and the piston 8 may again be moved downwardly, compressing spring 12, and thus a rapid discharge of air from the brake cylinder may again take place. The same action may occur successively while the brakes are being released, until the pressure in the brake cylinder has fallen to such a point that the piston will no longer be subjected to a pressure sufficient to compress the spring 12.

By varying the diameter of piston 8 with respect to the diameter of the casing bore, the tension of spring 12, the volume of chamber 13, the area of port 14, and the adjustment of stem 11, either a slow and continuous release of air from the brake cylinder may be effected, or an alternating series of rapid and slow discharges of air may be secured, or the adjustments may be such that a rapid discharge of air is followed by a continuous slow discharge.

The modified form of my invention, as shown in Fig. 5, may comprise a valve 19 adapted to seat on an extension 17 which is connected to the triple valve exhaust. The extension 17 carries trunnions 21 and supported by said trunnions is a casing 22, within which the valve 19 is mounted. The valve 19 is provided with a conical bore and mounted in said bore is a grooved member 26 having its lower end screw-threaded to engage screw-threads at the lower end of the bore.

Interposed between the member 26 and a plug 24, which has screw-threaded engagement in the lower end of the casing 22, is a spring 23. The grooved member 26 is conical and by rotating the screw-threaded portion 27 and the member 26, the clearance between the casing 19 and the member 26 may be varied as desired. The member 26 may be held in its adjusted position by means of a spring clip 28, which is adapted to engage notches cut in the periphery of the portion 27.

The valve 19 at its upper end is provided with a central opening, through which air passes from the extension 17 to the bore of the valve 19 and adjacent to the lowermost disk portion of the member 26, the valve 19 is provided with a port 29.

The tension of spring 23 may be adjusted by rotating the plug 24, and the plug may be held in its adjusted position by means of a set screw 31.

Secured to the portion 27 is a rod 32, which extends out of the casing 22 through a bore in the plug 24 and the rod provided with a handle 33. The rod 32 serves as a guide for the valve 19 and also, by pulling down the handle 33, provides means whereby the valve 19 may be manually unseated, when desired.

In the operation of the release controlling device shown in Fig. 5, when the brakes are released, air from the brake cylinder flows through the extension 17 from the triple valve exhaust port and acts on the exposed portion of the valve 19. If the pressure of air exceeds the tension of spring 23, the valve 19 will be moved from its seat, permitting air to escape directly to the atmosphere until the pressure has fallen sufficiently to permit the spring 23 to again close the valve. Air can then escape only by way of the central opening in the valve 19 and past the grooved member 26.

The rate of flow of air from the brake cylinder to the atmosphere will depend upon the extent of clearance provided by the adjustment of the member 26 and the tension at which the spring 23 may be adjusted. For example, the adjustment may be such that air will be discharged from the brake cylinder at the usual rate by the opening of valve 19 until the pressure has been reduced to a predetermined degree and then the remaining air in the brake cylinder may be discharged at a slow rate by way of the member 26.

Having now described my invention, what I claim as new and desire to secure by Letters Patent, is:—

1. A device for restricting the discharge of fluid under pressure from a brake cylinder comprising means for alternately restricting the flow and then allowing the fluid to exhaust into an enlarged space.

2. A device for restricting the discharge of fluid under pressure from a brake cylinder comprising a casing connected to the brake cylinder exhaust, and means in said casing for alternately restricting and expanding the flow of fluid from the brake cylinder.

3. A device for restricting the discharge of fluid under pressure from a brake cylinder comprising a casing connected to the brake cylinder exhaust, and a plurality of disks mounted in said casing and forming alternate restrictions and enlargements in the passageway through which fluid is discharged from the brake cylinder.

4. A device for restricting the discharge of fluid under pressure from a brake cylinder comprising a casing connected to the brake cylinder exhaust and a plurality of disks mounted in said casing and providing a restricted passage between each disk and the casing for the flow of fluid from the brake cylinder and having expansion chambers between successive disks.

5. A device for restricting the discharge of fluid under pressure from the brake cylinder comprising a casing having a conical bore, and a grooved conical member mounted in said casing providing successive restricted passages through which fluid is discharged from the brake cylinder.

6. A device for restricting the discharge of fluid under pressure from the brake cylinder comprising a casing having a conical bore, and an axially movable grooved conical member mounted in said casing and subject to the opposing pressures of the brake cylinder and a spring.

7. A device for restricting the discharge of fluid under pressure from the brake cylinder comprising a casing connected to the triple valve exhaust port and having a conical bore and an axially movable conical member mounted in said casing and having spaced disks, the peripheries of which provide passages between the walls of the casing and the disks for the flow of fluid discharged from the brake cylinder, said member being operated according to the pressure of fluid discharged from the brake cylinder for varying the area of said passages.

In testimony whereof I have signed my name to this specification.

EMILE EUGÈNE HENRI DUCHATEL.